United States Patent Office 3,298,199
Patented Jan. 17, 1967

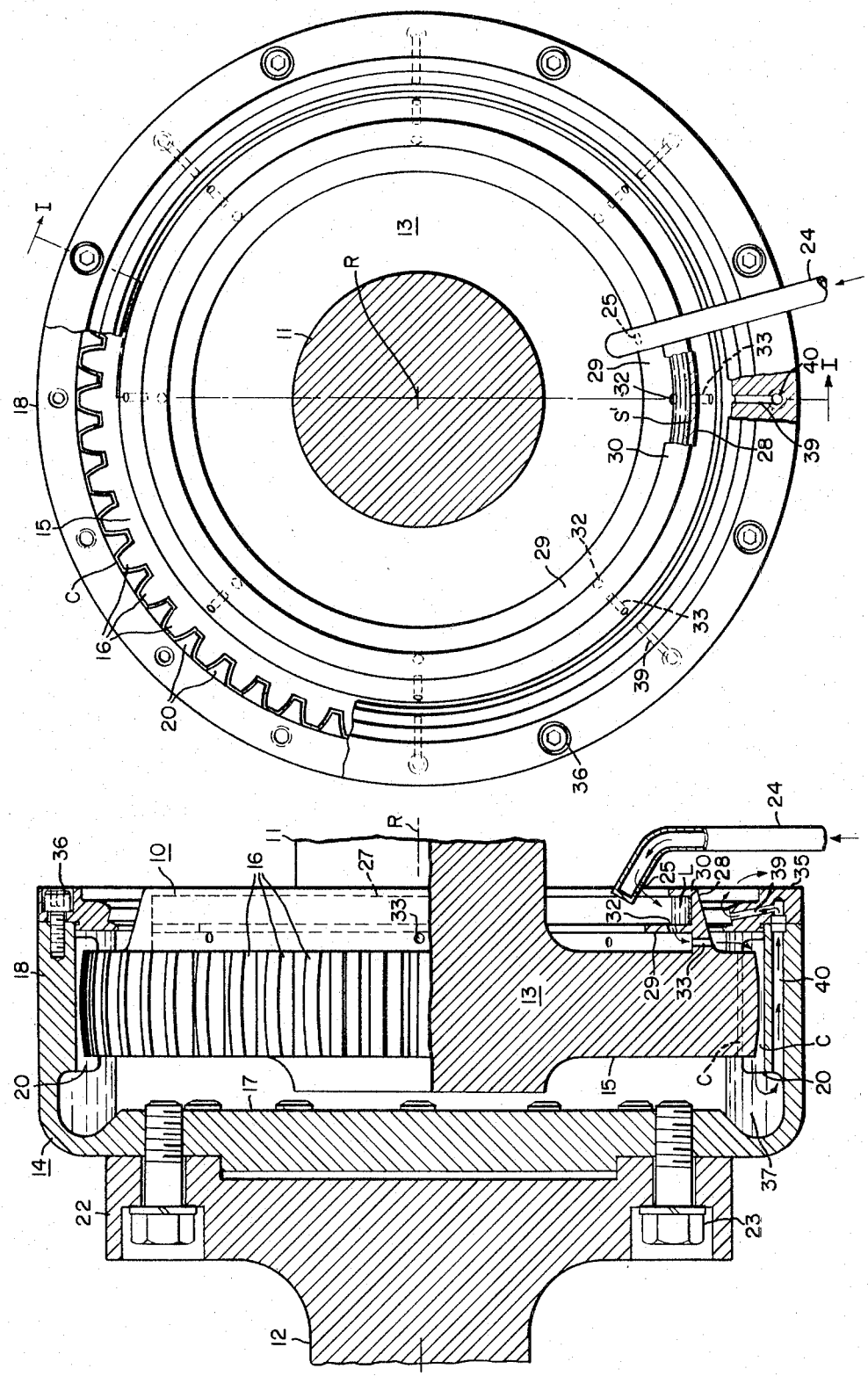

3,298,199
LIQUID COOLED COUPLING FOR A
ROTATABLE SHAFT
Charles D. Grey, Sunnyvale, Calif., assignor to Westinghouse Electric Corporation, East Pittsburgh, Pa., a corporation of Pennsylvania
Filed Nov. 18, 1964, Ser. No. 412,058
4 Claims. (Cl. 64—9)

This invention relates to power transmission apparatus, more particularly to couplings of the liquid cooled type, and has for an object to provide improved apparatus of this type.

High speed couplings, for example splined or dental type couplings, employed to transmit power require a continuous supply of liquid, such as oil, for cooling and lubrication. The oil, in passing through the coupling, is subjected to centrifugal force due to the rotational speed of the coupling which tends to collect any solid contaminants in the oil and deposit them in the region of the relatively movable engaging members, such as the splines or teeth. Such deposits interfere with the coupling action and in severe cases can result in coupling failure unless the deposits are removed therefrom.

A present dental coupling arrangement provides an annular pocket or recess where small amounts of solids in the circulating liquid, such as sludge, may accumulate without adversely affecting the operation of the coupling. During circulation the oil tends to purge the recess of sludge, thereby tending to prevent detrimental amounts from accumulating. However, this arrangement is not fully effective in highly loaded couplings operating in a high speed range, and collection of sludge may occur to such a degree that some gets into the region of the engaging members without being detected in time, thereby resulting in damage and even failure of the coupling.

In view of the above it is a primary object of the invention to provide a power transmitting coupling of the liquid cooled and/or lubricated type in which the solid contaminants from the liquid are collected by centrifugal action and prevented from entering the region of the mutually engaging members.

Another object is to provide a power transmitting coupling having mutually engaging members and means for circulating a coolant liquid therepast in which the solid contaminants from the liquid are collected by centrifugal action in a readily accessible portion of the coupling.

Briefly, in accordance with the invention, there is provided a shaft coupling having a male splined member received within a cup-shaped female splined member and with the splines in mutual driving engagement. Liquid, for example oil, is provided for cooling and/or lurbicating the splines and means is provided for circulating the oil past the splines by centrifugal forces induced during operation.

The liquid is preferably introduced by a nozzle disposed adjacent the open end of the female member and an annular cup is provided on one of the coupling members for intercepting the liquid spray and filtering the liquid before it is directed past the splines. The cup member is concentric with the rotational axis of the coupling members and is effective to disentrain solids from the liquid by centrifuging action.

The cup is visible and accessible from the open end of the female member, so that as the solids collect to a maximum safe degree, a visual inspection will determine that the collected solids should be removed, whereupon after operation of the coupling it is terminated the cup may be cleaned.

The above and the objects are effected by the invention as will be apparent from the following description and claims taken in connection with the accompanying drawings, forming a part of this application, in which:

FIGURE 1 is an axial sectional view of a coupling having the invention incorporated therein;

FIG. 2 is a right end view of the coupling shown in FIG. 1, with portions cut away to show internal details.

Figure 3:
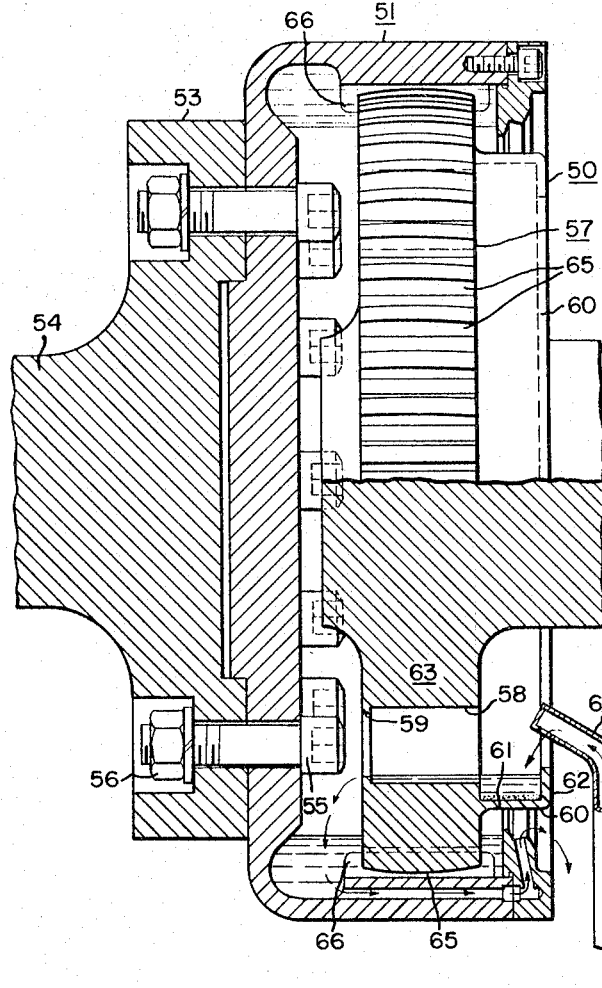
FIG. 3 is an axial sectional view similar to FIG. 1, but showing another embodiment of the invention.

Referring to the drawings in detail, in FIGS. 1 and 2 there is shown a coupling 10 for connecting a rotary driving shaft 11 to a rotary driven shaft 12. The coupling 10 is of the type generally known as a dental coupling and comprises a male coupling member 13 received in a female coupling member 14 and cooperatively associated therewith. The male coupling member 13 has a disc-shaped hub portion 15 provided with an annular array of radially outwardly disposed teeth or splines 16 disposed about its circular periphery and extending parallel to the axis of rotation R.

The female coupling member 14 is substantially cup-shaped and comprises a disc-shaped portion 17 and a cylindrical sleeve portion 18 formed integrally therewith. The sleeve portion 18 is provided with an annular array of radially inwardly extending teeth or splines 20 complementary to the teeth 16 and disposed in engagement therewith, as best shown in FIG. 2. A small degree of clearance C is provided between the teeth 16 and 20 and the teeth 16 are "barreled" or curved as shown in FIG. 1 to permit the coupling to operate smoothly even when some radial and/or angular misalignment is present between the two shafts 11 and 12, as known in the art.

The female coupling member may be attached to the shaft 12 in any suitable manner. However, as illustrated it is connected to a flange 22 provided on the shaft 12 by an annular array of bolts 23.

The coupling 10 is employed to transmit great power at high rotary speeds from the shaft 11 to the shaft 12, for example, on the order of 3,000 to 10,000 r.p.m. Hence, during operation, the engaging surfaces of the mating teeth 16 and 20 are subject to rubbing friction causing the generation of considerable heat and wear which must be minimized to prevent premature failure.

Accordingly, the coupling 10 is provided with liquid, such as oil for example, for cooling and/or lubrication purposes by a conduit 24 connected to a suitable liquid supply (not shown) and having an aperture 25 for delivering the liquid to the coupling in a solid jet stream or in spray form, as desired.

The male coupling member 13 is provided with an annular cup 27 disposed concentrically with the rotational axis R and comprising a generally cylindrical wall portion 28, an inner annular wall portion 29 and an outer annular wall portion 30. Accordingly, the opening in the cup 28 faces radially inwardly. The inner wall portion 29 is of somewhat larger radial extent than the outer wall 30 and is provided with an annular array of holes 32. The inner wall 29 is also spaced from the disc portion 15 and an annular array of holes 33 extend radially therebetween in the cylindrical wall portion 28.

The female coupling member 14 further comprises a liquid pumping ring structure 35 concentrically attached to the open end portion of the sleeve portion 18 in any suitable manner, for example, by an annular group of screws 36. The ring 35 extends radially inwardly to a greater extent than the teeth 16 on the male coupling member and jointly with the disc portion 17 and the sleeve portion 18 of the female coupling member, forms an annular space or recess 37. The ring member 35 is provided with an annular array of radially inwardly extending flow passages 39 disposed in communication with one end of an equal plurality of axially extending flow passages 40 formed in the sleeve member 18. The opposite ends of the passages 40 are disposed in open communication with the recess 37.

In operation, as the coupling 10 is driven by the drive shaft 11, a continuous supply of oil is supplied to the annular cup 27 by the conduit 24 through the spray aperture 25, the aperture 25 being arranged to direct the oil in generally radially outwardly direction into the cup. As the cup also rotates with the coupling, the collecting oil therein is subjected to substantial centrifugal action and maintains a level, indicated L, as determined by the location of the aperture 32. The excess oil is directed through the apertures 32 and 33 to that portion of the space 37 between the teeth 16, 20 and the oil ring 35, and thence through the tooth clearance spaces C, past the teeth 16, 20 for lubrication purposes. Subsequent thereto, the flow is reversed and is directed by the passages 40 to the passages 39, and then from the coupling to a suitable reservoir (not shown) for recirculation.

During the above operation, the oil level in the space 37 is greater than the oil level in the oil ring passages 39, hence the difference in centrifugal force acting on the two levels is preponderant in a direction to pump the oil from the space 37 through the passages 40 and 39. Accordingly, with constant circulation as described, heat induced in the teeth of the coupling is transferred to the oil and removed therewith.

Also, as the oil is continuously recirculated during operation, solid contaminants, for example sludge, are formed or collected by the oil and are flushed from the recess 37 by the oil flow. These contaminants may be partially removed in the reservoir (not shown) by settlement, but some of these contaminants are continuously returned to the coupling by the conduit 24.

The cup 27 is effective to centrifuge these contaminants from the oil, since these contaminants are heavier than the oil, and deposit them along the bottom of the cup as indicated by the dense layer S (FIG. 2). Accordingly, the cup is effective to intercept and collect the sludge before it is recirculated through the coupling.

The cup may be readily inspected from time to time to determine the amount of collected sludge, without the necessity of disassembling the coupling, i.e. without removing the male coupling member 13 from the female coupling member 14, since it is adjacent the open end of the sleeve portion 18. The sludge S may be readily wiped away by an operator, after rotation is interrupted incidental to operation or for the purpose of cleaning.

The coupling 10 may, if desired, be enclosed in a suitable housing (not shown) for safety and cleanliness, as well known in the art. If it is so enclosed, inspection of the coupling for collection can be made as explained above after a portion of the housing is removed to gain access to the coupling.

FIG. 3 shows another embodiment of the invention. In this embodiment, there is shown a dental coupling 50, generally similar to the coupling 10 illustrated in FIGS. 1 and 2 and already described.

In this embodiment, the female coupling member 51 has a disc-shaped portion 52 attached to a flange 53 of a rotary shaft 54 by a plurality of bolts 55 extending through the flange 53 and locked thereon by mating nuts 56.

Accordingly, to facilitate assembly and disassembly, the male coupling member 57 is provided with an annular array of circular holes 58 (only one shown) of sufficient size and located on the same radius as the bolts 55 to permit access to the bolts for removal and insertion thereof. An annular lip 59 may also be provided to reduce the diameter of the holes 58 at their downstream ends.

In this arrangement, the male coupling member is provided with an annular cup 60 having a cylindrical wall 61 and an annular wall 62. The wall 61 is attached to the disc portion 63 of the male coupling member radially outwardly of the holes 58, i.e. in encompassing relation therewith.

The remaining portions of the coupling may be substantially identical to the first embodiment.

In operation, oil is directed into the cup 60 by suitable injection means 64 and is subjected to a centrifuging action, thereby depositing the sludge at the bottom of the cup and purifying the oil before circulation through the splines 65, 66 of the male and female coupling members 57 and 51, respectively. As the oil fills the cup, it overflows and is directed through the holes 58 and over the lips 59 to the splines 65 and 66 for cooling and lubrication, and is thence directed from the coupling, as previously described.

As in the first embodiment, the degree of collection of sludge in the cup 60 may be readily detected by visual inspection and removed therefrom, as described, before it attains an excessive degree which might otherwise cause it to spill through the holes 58 and become re-entrained with the oil. The annular lip 59, however, is effective to capture small amounts of sludge that may get past the cup 60.

It will now be seen that the invention provides a simple yet effective arrangement for collecting solid contaminants from a liquid by centrifuging action in a coupling susceptible to damage by the contaminants in liquid circulated therethrough for cooling and/or lubrication.

While the invention has been shown in several forms, it will be obvious to those skilled in the art that it is not so limited, but is susceptible of various other changes and modifications without departing from the spirit thereof.

I claim as my invention:

1. A coupling for connecting a rotatable driving shaft to a rotatable driven shaft, comprising
   a male coupling member connectable to one of said shafts and having an annular array of radially outwardly directed splines,
   a female coupling member encompassing said male coupling member and connectable to the other of said shafts,
   said female coupling member having an annular array of radially inwardly directed splines disposed in engagement with said outwardly directed splines,
   an annular cup provided on said male member and jointly rotatable therewith, said cup being partly defined by an annular wall portion,
   nozzle means for directing liquid in radially outwardly direction into said cup,
   said cup being concentric with the rotational axis of said male coupling member and disposed radially inwardly of said splines, whereby said cup is effective to disentrain and collect solids from said liquid by centrifuging action,
   said cup being partly defined by a pair of radially extending wall portions,
   one of said wall portions having an annular array of apertures for directing liquid through the splines by centrifugal action for cooling and lubrication purposes, and
   means provided in the female coupling member for pumping the liquid from the splines by centrifugal action.

2. A coupling for connecting a high speed rotatable driving shaft to a rotatable driven shaft comprising
   an open-ended cup shaped female coupling member connected to one of said shafts and having an annular array of radially inwardly extending splines,
   a male coupling member connected to the other of said shafts,
   said male coupling member being received in said female coupling member and having an annular array of radially outwardly extending splines disposed in engagement with said inwardly extending splines,
   nozzle means disposed adjacent the open end of said female coupling member for providing liquid to said coupling members for cooling and lubrication purposes, an annular cup member provided on said male member adjacent said open end and arranged to initially intercept said liquid, said cup member being concentric with the rotational axis of said male coupling member and disposed radially inwardly of said splines, whereby said cup is effective to filter said liquid by collecting solids from said liquid by centrifuging action, and means for directing the filtered liquid from said cup longitudinally past said splines.

3. The structure recited in claim 2 wherein
the liquid directing means includes an annular array of radially extending apertures in the cup member, and further including means for centrifugally pumping the liquid from the splines.

4. The structure recited in claim 2 wherein
means is provided in the cup shaped female member forming an annular space, the liquid directing means includes an annular array of axially extending apertures in the male member disposed in a manner to receive the liquid overflow from the cup member and direct said overflow to said space, and means is provided for centrifugally pumping the liquid from said annular space.

References Cited by the Examiner

UNITED STATES PATENTS

| 2,726,523 | 12/1955 | Zrodowski | 64—9 |
| 2,964,929 | 12/1960 | Hoffmann | 64—9 |

FOREIGN PATENTS

| 905,212 | 3/1954 | Germany. |
| 667,217 | 2/1952 | Great Britain. |

FRED C. MATTERN, JR., *Primary Examiner.*

HALL C. COE, *Examiner.*